US011525077B2

(12) United States Patent
Gong et al.

(10) Patent No.: US 11,525,077 B2
(45) Date of Patent: Dec. 13, 2022

(54) GEOPOLYMER CONCRETES FOR ENERGY STORAGE APPLICATIONS

(71) Applicant: The Catholic University of America, Washington, DC (US)

(72) Inventors: Weiliang Gong, Rockville, MD (US); Hui Xu, Rockville, MD (US); Werner Lutze, Chevy Chase, MD (US); Ian L. Pegg, Alexandria, VA (US)

(73) Assignee: The Catholic University of America, Washington, DC (US)

( * ) Notice: Subject to any disclaimer, the term of this patent is extended or adjusted under 35 U.S.C. 154(b) by 0 days.

(21) Appl. No.: 16/517,802

(22) Filed: Jul. 22, 2019

(65) Prior Publication Data
US 2020/0031717 A1 Jan. 30, 2020

Related U.S. Application Data

(60) Provisional application No. 62/703,295, filed on Jul. 25, 2018.

(51) Int. Cl.
*C04B 14/02* (2006.01)
*C04B 14/30* (2006.01)
*C04B 18/02* (2006.01)
*C04B 18/16* (2006.01)
*C04B 22/06* (2006.01)
*C04B 28/02* (2006.01)
*C04B 28/08* (2006.01)
*C09K 5/14* (2006.01)
*C04B 28/00* (2006.01)
*C04B 103/10* (2006.01)

(52) U.S. Cl.
CPC .............. *C09K 5/14* (2013.01); *C04B 14/024* (2013.01); *C04B 14/303* (2013.01); *C04B 18/02* (2013.01); *C04B 18/167* (2013.01); *C04B 22/062* (2013.01); *C04B 28/006* (2013.01); *C04B 28/021* (2013.01); *C04B 28/082* (2013.01); *C04B 2103/10* (2013.01); *C04B 2201/32* (2013.01)

(58) Field of Classification Search
CPC ....... C09K 5/14; C04B 14/024; C04B 14/106; C04B 14/303; C04B 18/02; C04B 18/021; C04B 18/067; C04B 18/08; C04B 18/081; C04B 18/082; C04B 18/084; C04B 18/085; C04B 18/141; C04B 18/142; C04B 18/143; C04B 18/144; C04B 18/145; C04B 18/167; C04B 22/06; C04B 22/062; C04B 22/064; C04B 28/006; C04B 28/021; C04B 28/082; C04B 2103/10; C04B 2111/00465; C04B 2201/30; C04B 2201/32

See application file for complete search history.

(56) References Cited

U.S. PATENT DOCUMENTS

| | | | | |
|---|---|---|---|---|
| 9,090,508 | B2* | 7/2015 | Gong | C04B 28/006 |
| 9,321,681 | B2* | 4/2016 | Dubey | C04B 28/006 |
| 9,834,479 | B2* | 12/2017 | Gong | C04B 7/243 |
| 2004/0182285 | A1 | 9/2004 | Mazany et al. | |
| 2014/0264140 | A1* | 9/2014 | Gong | C04B 28/006 252/62 |
| 2018/0031337 | A1* | 2/2018 | Guarrero | E01C 11/265 |

FOREIGN PATENT DOCUMENTS

| | | | | |
|---|---|---|---|---|
| CN | 106372289 | A | 2/2017 | |
| CN | 107265937 | A | 10/2017 | |
| JP | 2014129237 | A * | 7/2014 | |
| WO | 2011/135584 | A2 | 11/2011 | |
| WO | 2012/083255 | A1 | 6/2012 | |
| WO | WO-2015020612 | A1 * | 2/2015 | ............ C04B 28/04 |
| WO | 2015/049010 | A1 | 4/2015 | |
| WO | 2017/199198 | A1 | 11/2017 | |

OTHER PUBLICATIONS

John et al. ("Concrete as a thermal energy storage medium for thermocline solar energy storage systems," Solar Energy 96, pp. 194-204). (Year: 2013).*
English language machine translation of Harada et al.(JP 2014-129237 A). (Year: 2014).*
Kovarik et al. ("Thermochemical properties of particle-reinforced geopolymer composite with various aggregate gradation of fine ceramic filler," Construction and Building Materials 143, pp. 599-606). (Year: 2017).*
Khalil et al. ("Mechanical properties and thermal conductivity of lightweight geopolymer concrete," 2018 1st International Scientific Conference of Engineering Sciences—3rd Scientific Conference of Engineering Science (ISCES), Diyala, Jan. 10-11, 2018, pp. 175-180). (Year: 2018).*
Snell et al. ("Comparison of the Thermal Characteristics of Portland Cement and Geopolymer Cement Concrete Mixes", J. Archit. Eng., vol. 23, 04017002-1-040107002-10, 2017) (Year: 2017).*
Fernandez-Jimenez, J. Y. Pastor, A. Martin, A. Palomo, High-temperature resistance in alkali-activated cement, Journal of the American Ceramic Society 93 (2010) 3411-3417.
D.L.Y. Kong, J.G. Sanjayan, Effect of elevated temperatures on geopolymer paste, mortar and concrete, Cement and Concrete Research 40 (2010) 334-339.
Z. Pan, J. Sanjayan, B. Rangan, An investigation of the mechanisms for strength gain or loss of geopolymer mortar after exposure to elevated temperature Journal of Materials Science 44 (2009) 1873-1880.

(Continued)

*Primary Examiner* — Matthew R Diaz
(74) *Attorney, Agent, or Firm* — Ajay A. Jagtiani; Miles & Stockbridge P.C.

(57) ABSTRACT

A geopolymer thermal energy storage (TES) concrete product comprising at least one binder; at least one alkali activator; at least one fine aggregate with high thermal conductivity and heat capacity; and at least one coarse aggregate with high thermal conductivity and heat capacity.

30 Claims, No Drawings

(56) References Cited

OTHER PUBLICATIONS

Z. Pan and U.S. Sanjayan, and F. Collins, Effect of transient creep on compressive strength of geopolymer concrete for elevated temperature exposure, Cement and Concrete Research 56 (2014) 182-189.

Z. Pan and U.S. Sanjayan, Stress-strain behaviour and abrupt loss of stiffness of geopolymer at elevated temperatures, Cement and Concrete Composites 32 (2010) 657-664.

Z. Pan and U.S. Sanjayan, Factors influencing softening temperature and hot-strength of geopolymers, Cement and Concrete Composites 34 (2012) 261-264.

Martin, J.Y. Pastor, A. Palomo, A.F. Jimenez, Mechanical behaviour at high temperature of alkali-activated aluminosilicates (geopolymers), Construction and Building Materials 93 (2015) 1188-1196.

Michael Berry, Jeffy Stephens, and Doug Cross, Performance of 100% Fly Ash Concrete with Recycled Glass Aggregate; ACI Materials Journal, Technical Paper (2011) 379-384.

Cahit Bilim, Properties of cement mortars containing clinoptilolite as a supplementary cementitious material, Construction and Building Materials 25 (2011) 3175-3180.

E.I Diaz, E.N. Allouche, S. Eklund, Factors effecting the suitability of fly ash as source materials for geopolymers, Fuel 89 (2010) 992-996.

E. Ivan Diaz-Loya, Erez N. Allouche, and Saiprasad Vaidya, Mechanical Properties of Fly-Ash-Based Geopolymer Concrete, ACI Materials Journal (2011) 301-306.

Goril Moschner, Barbara Lothenbach, Renato Figi, Ruben Kretzschmar, Influence of citric acid on the hydration of Portland cement, Cement and Concrete Research 39 (2009) 275-282.

Alaa M. Rashad, A comprehensive overview about the influence of different admixtures and additives on the properties at alkali-activated fly ash. Materials and Design 53 (2014) 1005-1025.

Gil, M. Medrano, 1. Martorell, A. Lazaro, P. Dolado, B. Zalba, L.F. Cabeza, State of the art on high temperature thermal energy storage for power generation. Part 1—Concepts, materials and modellization, Renewable and Sustainable Energy Reviews 14 (2010) 31-55.

S. Kuravi, J. Trahan, D.Y. Goswami, M.M. Rahman, E.K. Stefanakos, Thermal energy storage technologies and systems for concentrating solar power plants, Progress in Energy and Combustion Science 39 (2013) 285-319.

J. Herrmann and D. Kearney, Survey of Thermal Energy Storage for Parabolic Trough Power Plants, ASME Journal of Solar Energy Engineering 124 (2002) 145-152.

H.L. Zhang, J. Baeyens, G. Caceres, J. Degreve, Y.Q. Lu, Thermal energy storage: Recent developments and practical aspects, Progress in Energy and Combustion Science 53 (2016) 1-40.

K.S. do Couto Aktay, R. Tamme, H. Muller-Steinhagen, Thermal Conductivity of High-Temperature Multicomponent Materials with Phase Change, International Journal of Thermophysics 29 (2008) 678-692.

E. John, M. Hale, P. Selvam, Concrete as a thermal energy storage medium for thermocline solar energy storage systems, Solar Energy, 96 (2013) 194-204.

R. Tiskatine, A. Aharoune, L. Bouirden, A. Ihlal, Identification of suitable storage materials for solar thermal power planl using selection methodology, Applied Thermal Engineering 117 (2017) 591-608.

R. Tamme, D. Laing, W.-D. Steinmann, Advanced thermal energy storage technology for parabolic trough Proceedings of 2003 International Solar Energy Conference, Hawaii, Mar. 15-18, 2003.

D. Laing, W.-D. Steinmann, R. Tamme, C. Richter, Solid Media Thermal Storage for Parabolic Trough Power Plants, Solar Energy 80 (2006) 1283-1289.

D. Laing, W.-D. Steinmann, M. Fiss, R. Tamme, T. Brand, C. Bahl, Solid Media Thermal Storage Development and Analysis of Modular Storage Operation Concepts for Parabolic Trough Power Plants, ASME Journal of Solar Energy Engineering, 130 (2008) 011006.

D. Laing, D. Lehmann, M. Fiss, C. Bahl, 2009, Test Results of Concrete Thermal Energy Storage for Parabolic Trough Power Plants, ASME Journal of Solar Energy Engineering 131 (2009) 041007.

D. Laing, C. Bahl, T. Bauer, D. Lehmann, W.D. Steinmann, Thermal energy storage for direct steam generation, Solar Energy 85 (2011) 627-633.

D. Laing, C. Bahl, T. Bauer, M. Fiss, N. Breidenbach, M. Hempel, High-Temperature Solid-Media Thermal Energy Storage for Solar Thermal Power Plants, Proceedings of the IEEE 100 (2012) 516-524.

V.A. Salomoni, C.E. Majorana, G.M. Giannuzzi, A. Miliozzi, R. Di Maggio, F. Girardi, D. Mele, M. Lucentini, Thermal storage of sensible heat using concrete modules in solar power plants, Solar Energy 103 (2014) 303-315.

C Ferone, F Colangelo, D Frattini, G Roviello, R Cioffi, R. di Maggio, Finite element method modeling of sensible heat thermal energy storage with innovative concretes and comparative analysis with literature benchmarks, Energies 7 (2014) 5291-5316.

Y. Jian, F. Bai, Q. Falcoz, Z. Wang, Control Strategy of the module concrete thermal energy storage for parabolic trough power plants, Energy Procedia 69 (2015) 891-899.

H. Niyas, L. Prasad, P. Muthukumar, Performance investigation of high-temperature sensible heat thermal energy storage system during charging and discharging cycles, Clean Technology and Environmental Policy 17 (2015) 501-513.

R. Boonsu, S. Sukchai, S. Hemavibool, S. Somkun, Performance Analysis of Thermal Energy Storage Prototype in Thailand, Journal of Clean Energy Technologies 4 (2016) 101-106.

P. Kalifa, F.D. Menneteau, D. Quenard, Spalling and pore pressure in HPC at high temperatures, Cement and Concrete Research 30 (2000) 1915-1927.

V. Kodur and W. Khaliq, Effect of temperature on thermal properties of different types of high-strength concrete, Journal of Materials in Civil Engineering 23 (2011) 793-801.

D. Cree, M. Green, A. Noumowe, Residual strength of concrete containing recycled materials after exposure to fire: A review, Construction and Building Materials 45 (2013) 208-223.

V. Kodur, Properties of concrete at elevated temperatures, ISRN Civil engineering (2014) 1-15.

Q.M. Ma, R.X.Guo, Z.M. Zhao, Z.W. Lin, K.C. He, Mechanical properties of concrete at high temperature—A review, Construction and Building Materials 93 (2015) 371-383.

K.D. Hertz, Limits of spalling of fire-exposed concrete, Fire Safety Journal 38 (2003) 103-116.

J.C. Mindeguia, P. Pimienta, A. Noumowe, M. Kanema, Temperature, pore pressure and mass variation of concrete subjected to high temperature—Experimental and numerical discussion on spalling risk, Cement and Concrete Research 40 (2010) 477-487.

L.T. Phan, J.R. Lawson and F.L. Davis, Effects of elevated temperature exposure on heating characteristics, spalling, and residual properties of high performance concrete, Materials and Structures 34 (2001) 83-91.

J. Zhao, J.-J. Zheng, G.-F.Peng, and K. van Breugel, A meso-level investigation into the explosive spalling mechanism of high-performance concrete under fire exposure, Cement and Concrete Research 65 (2014) 64-75.

S.S.M. Tehrani, R.A. Taylor, K. Nithyanandam, A.S. Ghazani, Annual comparative performance and cost analysis of high temperature, sensible thermal energy storage systems integrated with a concentrated solar power plant, Solar Energy 153 (2017) 153-172.

M. Martins, U. Villalobos, T. Delclos, P. Armstrong, P.G. Bergan, N. Calvet, New concentrating solar power facility for testing high temperature concrete thermal energy storage, Energy Procedia 75 (2015) 2144 2149.

B.A. Graybeal, Material Property Characterization of Ultra-High Performance Concrete, Federal Highway Administration, Publication No. FHWA-HRT-06-103, 2006.

E.E. John, W.M. Hale, R. P. Selvam, Effect of High Temperatures and Heating Rates on High Strength Concrete for Use as Thermal Energy Storage, ASME 2010 4th International Conference on Energy Sustainability, vol. 2, Phoenix, Arizona, USA, May 17-22, 2010.

(56) References Cited

OTHER PUBLICATIONS

J.E. Skinner, M.N. Strasser, B.M. Brown and R.P. Selvam, Testing of high-performance concrete as a thermal energy storage medium at high temperatures, ASME Journal of Solar Energy Engineering 136 (2014) 021004.
S. Aydin, B. Baradan, High Temperature Resistance of Alkali-activated slag- and Portland Cement-Based Reactive Powder Concrete, ACI Materials Journal 109 (2012) 463-470.
M C. Alonso, J. Vera-Agullo, L. Guerreiro, V. Flor-Laguna, M. Sanchez, M. Collares-Pereira, Calcium aluminate based cement for concrete to be used as thermal energy storage in solar thermal electricity plants, Cement and Concrete Research 82 (2016) 74-86.
P. Duxson, F. Femandez-Jimmenez, J.L. Provis, G.C. Lukey, A. Palomo, and J.S.J. van Deventer, Geopolymer technology: The current state of the art, Journal of Materials Science 42 (2007) 2917-2933.
J. Davidovits, Geopolymer Chemistry and Applications, 4th edition, Geopolymer Institute, France, (2015).
J. L. Provis, J.S.J. van Deventer, Alkali Activated Materials, State-of-the-Art Report, Rilem TC 224-AAM, Springer, Heidelberg, New York, (2014).
J. L. Provis and S.A. Bernal, Geopolymers and Related Alkali-Activated Materials, Annual Review in Materials Research 44 (2014) 299-327.
F. Pacheco-Torgal, J. Labrincha, C. Leonelli, A. Palomo and P. Chindaprasit, Handbook of Alkali-activated Cements, Mortars and Concretes, Woodhead Publishing Series in Civil and Structural Engineering, Elsevier Ltd (2014) 852.
L. Vickers, A. van Riessen, W.D.A. Rickard, Fire-Resistant Geopolymers: Role of Fibres and Fillers to Enhance Thermal Properties, SpringerBriefs in Materials, Springer Singapore Heidelberg, New York, Dordrecht, London, (2015) 127.
H-C. Shin and Y. Chung, Determination of coefficient of thermal expansion: Effects on Louisiana's PCC pavement iesign, Technical report FHWA/LA. 11/451 (2011).
S. Khare, M. Dell'Amico, C. Knight, and S. McGarry, Selection of materials for high temperature latent heat energy storage. Solar Energy Materials and Solar Cells 107 (2012) 20-27.
A.A. Adeyanju, Effects of Pressure and Friction Parameters on a Concrete Bed Energy Storage System, Energy Technology and Policy 2 (2015) 1-9.
T. Bakharev, Thermal behaviour of geopolymers prepared using class F fly ash and elevated temperature curing, Dement and Concrete Research 36 (2006) 1134-1147.
W.D.A Rickard, R. Williams, J. Temuujin, A. van Riessen, Assessing the suitability of three Australian fly ashes as an aluminosilicate source for geopolymers in high temperature applications, Materials Science and Engineering A528 (2011) 3390-3397.
M. Guerrieri, J. Sanjayan, F. Collins, Residual strength properties of sodium silicate alkali activated slag paste exposed to elevated temperatures, Materials and Structures 43 (2010) 765-773.
S.A. Bernal, E.D. Rodriguez, R.M. de Gutierrez, M. Gordillo, J.L. Provis, Mechanical and thermal characterisation of geopolymers based on silicate-activated metakaolin/slag blends, Journal of Materials Science 46 (2011) 5477-5486.
Z. Pan, Z., Tao, Z., Cao, Y., Bajracharya, N., Murphy, T. D., & Wuhrer, R. (2016). Comparative performance of alkali-activated slag and fly ash at elevated temperatures (H. Hao & C. Zhang, Eds.), Proceedings of the 24th Australasian Conference on the Mechanics of Structures and Materials (ACMSM24), Perth, Australia, Dec. 6-9, 2016. 415-420.
A.M. Rashad, S.R. Zeedan, The effect of activator concentration on the residual strength of alkali-activated fly ash pastes subjected to thermal load, Construction and Building Materials 25 (2011) 3098-3107.
P. Rovnanik, P. Bayer, P. Rovnankov, Characterization of alkali activated slag paste after exposure to high temperatures, Construction and Building Materials 47 (2013) 1479-1487.
International Search Report and Written Opinion received in International Application No. PCT/IB2019/056288 dated Dec. 24, 2019.
Chinese Office Action received in Chinese Application No. 201980063330.6 dated Mar. 3, 2022.
United Kingdom Office Action received in Great Britain Application No. GB2101527.6 dated Feb. 15, 2022 and referenced Office Action dated Sep. 14, 2021.
U.S. Office Action received in U.S. Appl. No. 16/517,802 dated Jan. 18, 2022.
Extended European Search Report received in European Application No. 19839974.3 dated May 11, 2022.
Examination Report received in Great Britain Application No. GB2101527.6 dated May 10, 2022.
Mackechnie et al., "Thermal performance of variable density wall panels made using Portland cement or inorganic polymer concrete", Materials and Structures, No. 48, pp. 643-651 (2015).
Snell et al., "Comparison of the Thermal Characteristics of Portland Cement and Geopolymer Cement Concrete Mixes", J. Archit. Eng., vol. 23, 04017002-1-04017002-10 (2017).
Zainab et al., "Optimization of a geopolymer mixture for a reinforced cantilever concrete bench", The 9th International Symposium on Cement and Concrete, ISCC 2017 (2017).

* cited by examiner

GEOPOLYMER CONCRETES FOR ENERGY STORAGE APPLICATIONS

CROSS-REFERENCE TO RELATED APPLICATIONS

This application claims benefit of priority of U.S. Provisional Patent Application No. 62/703,295 entitled, "GEOPOLYMER CONCRETES FOR ENERGY STORAGE APPLICATIONS" filed Jul. 25, 2018. The entire content and disclosure of this provisional patent application is incorporated herein by reference in their entirety.

BACKGROUND

Field of the Invention

The present disclosure is related to advanced geopolymer concretes specific for thermal energy storage applications.

Background of the Invention

There is a need for developing a low cost, solid thermal energy storage media that will maintain high mechanical strength (e.g., compressive and flexural), high thermal performances (e.g., thermal conductivity, specific heat capacity) throughout the long service time at elevated operational temperatures.

SUMMARY OF THE INVENTION

According to first broad aspect, the present disclosure provides a geopolymer thermal energy storage (TES) concrete product comprising at least one binder; at least one alkali activator; at least one fine aggregate with high thermal conductivity and heat capacity; and at least one coarse aggregate with high thermal conductivity and heat capacity.

DETAILED DESCRIPTION OF THE INVENTION

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternatives falling within the spirit and the scope of the invention.

In recent years, due to the high cost of energy as well as an increased interest in the reduction of greenhouse gas emissions, the development of alternative resources is sought, such as solar energy and wind energy. However, the intermittent availability of solar energy leads to an energy gap between demand and supply, i.e. on sunny days, solar energy collected is usually more than required for the direct use. Therefore, the design and development of efficient and economical thermal energy storage (TES) systems are of vital importance for solar power plants. The same applies to wind energy plants and industrial waste heat recovery. However, only very few solar thermal power plants in the world have employed these TES systems.[1, 2, 3, 4]

Thermal energy can be stored in the form of sensible heat, latent heat and heat of reversible chemical reactions. Presently, liquid media storage, e.g., molten salts is a well-known and commercially adopted technology for high-temperature heat storage applications. Phase change materials (PCMs) belong to the category of latent heat storage media involving solid-liquid (fusion) transition. Though the energy density of PCMs is high, heat transfer design and media selection is difficult. Currently nitrate salts are employed in utility scale TES systems. While melting temperatures for nitrate salts are relatively low, e.g. up to 350° C., their low thermal conductivity leads to slow charging and discharging rates.[5] The performance of the materials degrades after a moderate number of freeze-melt cycles.

According to the Department of Energy (DOE), the unit cost to store thermal energy is approximately \$30.00/kWh$_{thermal}$. When solar energy is used as the heat source, the cost per kilowatt-hour electric is high, about \$0.15-\$0.20/kWh$_{electric}$. The unit cost of electricity by burning fossil fuels is \$0.05-\$0.06/kWh. Clearly, current technologies cannot compete with traditional forms of electricity generation. In response, the DOE has established a goal of reducing the cost of solar generated electricity to \$0.05-\$0.07/kWh$_{electric}$ and achieving thermal storage cost below \$15.00/kWh$_{thermal}$. Therefore, reduction in the cost of the storage medium is a critical step in achieving the stated goal.[6]

An attractive option regarding investment and maintenance costs is the application of solid sensible heat storage media.[3] Examples of these solid sensible heat storage materials include alumina ceramics, silicon carbide ceramics, brick magnesia, silica firebricks, cast iron, and graphite.[4, 7] Portland cement (PC) based concrete as an energy storage material is inexpensive and the PC concrete is the only media whose cost per kWh$_{thermal}$ are reported to be \$1 (https://news.uark.edu/articles/19653/researchers-develop-effective-thermal-energy-storage-system), far below the Department of Energy's goal of achieving thermal energy storage at a cost of \$15 per kilowatt-hour. The German Aerospace Center successfully tested a first PC concrete storage on the Plataforma Solar de Almeria in Spain in 2003/2004 within a project funded by the German government.[8, 9, 10, 11, 13] Typically, a solid medium thermal storage system includes a matrix solid material with embedded heat exchangers. During charge, thermal energy is transferred from the heat transfer fluid (HTF) (solar power plant) or exhaust gas (coal burning power plant) to the storage system. At discharge, thermal energy is transferred from the storage system to water for example, for direct steam generation.[12]

Portland cement concrete (PCC) as a sensible heat storage medium has been studied and tested rather extensively.[6, 14, 15, 16, 17] Portland cement based concretes are unstable upon exposure to elevated temperatures.[19, 20, 21, 22, 23] Calcium silicate hydrate (CSH) is the primary hydration product of the Portland cement and the principal binding phase in conventional concrete. Other hydration products include gypsum, hydrated lime and ettringite. Upon exposure to elevated temperatures, e.g., in the case of fire, ettringite dehydrates and decomposes at 70-90° C. Evaporable water is removed from the concrete at 100-120° C. Gypsum decomposes at 110-170° C. Hydrated lime decomposes into lime and water at 350-550° C. and CSH gel dehydrates and decomposes at 200-700° C.[21] In general, Portland cement concrete is rather stable upon exposure to temperatures below 300° C. though microcracks may occur. At around 400° C. and above, cracking and spalling occur due to higher internal pressures because of massive dehydration and decomposition of CSH.[24, 25, 26, 27] At above 600° C., Portland cement concrete may become porous and powdered and may loose its physical integrity entirely during a longer duration of high temperature exposure.

High operation temperatures for a concrete thermal energy storage system are always desirable.[29] Due to intrinsic instability of Portland cement concrete upon exposure to elevated temperatures, maximum operation temperatures for a concrete TES were limited to be below 400° C.[3, 28] For example, Laing et al.[11, 13] conducted testing with a Portland cement concrete TES system that was operated at maximum temperatures between 300° C. and 400° C. for about 100 thermal cycles.

A higher operation temperature for a TES system yields a higher power density. The amount of thermal energy stored in a mass of a solid storage medium can be expressed as $Q=\rho \times C_p \times V \times \Delta T$, where Q is the amount of heat stored (J), $\rho$ is the density of the material (kg/m$^3$), $C_p$ is the specific heat over the temperature range of operation (J/(kg·K), V is the volume of the material used (m$^3$) and $\Delta T$ is the temperature range of operation. For a given material, the ability to store sensible thermal energy depends on the value of the quantity $\rho \times C_p$. The energy storage density of a sensible heat TES system is directly proportional to the temperature difference and specific heat capacity ($C_p$). A higher operating temperature usually results in a larger temperature difference and thus increases the quantity of energy per unit volume of the materials that can be stored.

In addition, the thermal energy storage medium should possess high thermal conductivity (TC) to enable efficient charging and discharging.

Portland cement ultrahigh performance concrete is a class of concrete defined by its exceptionally high strength and durability.' It was developed in Europe in the 1980s for specialized applications that demand superior strength and corrosion resistance—marine anchors, piers and seismic structures. PC-UHPC is a cementitious composite material composed of an optimized gradation of granular constituents, a water-to-cementitious materials ratio less than 0.25, and a high percentage of discontinuous internal fiber reinforcement. The mechanical properties of PC-UHPC include compressive strength greater than 20,000 psi or 140 MPa. John et al.[31] reported a PC-UHPC TES system that was tested at 500° C. Explosive spalling was observed when the PC-UHPC was heated above 500° C. when polyethylene fiber was not included in the concrete mix. Skinner et al.[32] at University of Arkansas has further developed ultrahigh performance concrete TES device. Several PC-UHPC mixes were reported to withstand thermal cycling at temperatures exceeding 500° C. Unfortunately, cracking and water vapor expelling from the device were observed during charging.' Aydin and Baradan[33] tested high temperature resistance of alkali activated slag and Portland cement based UHPC. It was found that the PC-UHPC simply failed at temperatures above 400° C. due to severe spalling. PC-UHPC mixes usually include significantly higher amounts of Portland cement, e.g., 650 to 1000 kg/m$^3$ as compared to 300 to 400 kg/m$^3$ for normal strength concrete (NSC). In turn, more CSH gels forms, dehydration and decomposition of CSH gels become more severe at temperatures above 400° C. Besides, a significant amount of superplasticizer solids, e.g., 0.5 to 1.5 vol. % is usually employed to decrease the water to binder ratio (w/b) below 0.25. Superplasticizer is an organic molecule that is unstable at higher temperatures, which impairs performance of a PC-UHPC TES system. Most importantly, PC-UHPC is very expensive and therefore, it is preventive that PC-UHPC be used in TES systems in terms of the cost factor.

Alonso et al.[34] proposed to use calcium aluminate cement based refractory concrete (CAC) as a sensible thermal energy storage medium. Though CAC concrete exhibits relatively high thermal stability, dehydration of main hydration products such as hexagonal calcium aluminates ($C_2AH_8$, $CaH_{10}$ and $AH_3$) occurs at relatively low temperatures, e.g., below 300° C. The calcium aluminate cement is very expensive as well. Therefore, there is an immediate need for developing a low cost, solid thermal energy storage media that will maintain high mechanical strength (e.g., compressive and flexural), high thermal performances (e.g., thermal conductivity, specific heat capacity) throughout the long service time at elevated operational temperatures, e.g., 600° C. and above.

The objective of the present disclosure is to provide geopolymer concrete mix compositions to manufacture thermal energy storage systems, which will be operated at temperatures, for example, up to 800° C.

One embodiment described herein provides high strength, high TC geopolymer concrete compositions for thermal energy storage applications. A geopolymer concrete composition comprises: (i) at least one binder material; (ii) at least an aqueous alkali silicate activator, (iii) at least one fine aggregate with high thermal conductivity and specific heat capacity, and (iv) at least one coarse aggregate with high thermal conductivity and specific heat capacity.

In some embodiments, At least one binder material is selected from the group: class F fly ash, metakaolin, Class C fly ash, ground granulated blast furnace slag, vitreous calcium aluminosilicate, and natural pozzolans.

One embodiment described herein provides geopolymer concrete compositions for thermal energy storage applications. A geopolymer concrete composition comprises: (i) Class F fly ash having less than or equal to 8 wt % of calcium oxide; (ii) at least an aqueous alkali silicate activator, (iii) at least one fine aggregate with high thermal conductivity and specific heat capacity, and (iv) at least one coarse aggregate with high thermal conductivity and specific heat capacity.

In this embodiment, the solid mixture of binder, fine and coarse aggregates and additives, if any, are mixed with at least an aqueous alkali silicate activator solution, poured into the mold for the TES device and cured at temperatures above 45° C., preferably between about 60 and about 85° C. for about 12 to 48 hours at a relative humidity higher than 90%.

Another embodiment described herein provides geopolymer concrete compositions for thermal energy storage applications. A geopolymer concrete composition comprises: (i) Class F fly ash having less than or equal to 8 wt % of calcium oxide; (ii) metakaolin; (iii) at least one fine aggregate with high thermal conductivity and specific heat capacity, and (iv) at least one coarse aggregate with high thermal conductivity and specific heat capacity.

The geopolymer concrete has a curing temperature between about 20° C. and about 85° C.

Another embodiment described herein provides geopolymer concrete compositions for thermal energy storage application. A geopolymer concrete composition comprises: (i) Class F fly ash having less than or equal to 8 wt % of calcium oxide; (ii) at least one high-Ca aluminosilicate selected from the group: blast furnace slag, class C fly ash, and vitreous calcium aluminosilicate; (iii) at least an aqueous alkali silicate activator, (iv) at least one fine aggregate with high thermal conductivity and specific heat capacity, and (v) at least one coarse aggregate with high thermal conductivity and specific heat capacity.

The geopolymer concrete has a curing temperature between about 20° C. and about 85° C.

In some embodiments, fine aggregate and additives are selected from the group: quartz sand, alumina sand, fused $Al_2O_3$, bauxite, magnetite, magnesia, spinel, kyanite, rutile, natural graphite, graphene, and steel or iron grits and coarse aggregate from the group: quartz gravel, granite, basalt, diorite, quartzite, recycled porcelains, and recycled refractories.

In one embodiment, a geopolymer concrete for thermal energy storage application further includes certain thermally conductive fibers, selected from the group: steel fiber, copper coated steel fiber, silicon carbide fiber, and carbon fiber.

In one embodiment, a geopolymer concrete for thermal energy storage applications further includes micron- and submicron fillers, selected from the group: ground quartz powder, silica fume, hematite, and alumina.

Another embodiment provides a geopolymer concrete composition for thermal energy applications, which has a compressive strength of at least about 1500 psi, a thermal conductivity of at least about 1 W/(m·K), and a specific heat capacity of at least about 1 $MJ/m^3/K$ after heat treatment at 600° C. for 6 hours.

Alkali-activated materials (AAM), including the materials referred to as 'geopolymers', have attracted much interest in academic and commercial areas over the past decades. Alkali activation is a chemical process in which an aluminosilicate material such as blast furnace slag (BFS), metakaolin (MK), Class F fly ash (FFA), and Class C fly ash (CFA) or mixtures thereof are mixed with an alkali activator to yield a paste that sets and hardens in a short period of time.[35] The activator is typically a concentrated aqueous solution of alkali hydroxide and alkali silicate. Extensive studies have been conducted on AAMs and geopolymers and these alkali-activated materials possess certain desirable properties such as high and ultrahigh strength, high resistance to fire, acid, freeze-thaw cycles and alkali-silica reaction. In particular, geopolymer materials possess high fire resistance and high thermal stability when exposed to elevated temperatures.[49, 50, 51, 53, 54, 55, 56] Results have been summarized in recent review articles and books.[37, 38, 39, 40]

A generic geopolymer is referred to as alkali aluminosilicate or inorganic polymer. The reactive aluminosilicates usually contain very low CaO, including metakaolin and low-Ca Class F fly ash. Alkali activation of these low-CaO aluminosilicates yields alkali aluminosilicate gels (AAS) with a three-dimensional network structure similar to those of zeolite structures featuring tetrahedral coordination of Si and Al atoms linked by oxygen bridges, with alkali metal cations (typically $Na^+$ and/or $K^+$) associated as charge balancers for $AlO_4^-$, although the distinctive zeolite crystal structures are absent. This type of geopolymers is amorphous to X-rays. The dissolution of the reactive aluminosilicate source by alkaline hydrolysis consumes water and produces aluminate and silicate species. This first stage of the geopolymerization is controlled by the aptitude of the alkaline compound to dissolve amorphous or glass networks and to produce small reactive species of silicates and aluminates. A complex mixture of silicate, aluminate and aluminosilicate species is thereby formed. The solution becomes more and more concentrated, resulting in the formation of an alkali aluminosilicate gel as the species in the aqueous phase form large networks by polycondensation. After gelation, the system continues to rearrange and reorganize, as the connectivity of the gel network increases, resulting in a three-dimensional aluminosilicate network that sets and hardens during a subsequent curing process.

Nominally, the empirical formula of geopolymers can be presented as $M_n[—(SiO_2)_z—AlO_2]_n wH_2O$ where M represents the alkalis cation; z, the molar ratio of Si to Al (1, 2 or 3); and n, the degree of polycondensation.[35, [37, 38]] Water is in general not a part of the geopolymer structure. Water molecules will be removed completely during treatment at high temperatures with a minimum impact on the geopolymer network structure.

In contrast, alkali activation of certain high-CaO aluminosilicate materials, such as BFS, CFA and vitreous calcium aluminosilicate (VCAS) yields primarily calcium silicate hydrate (CSH), calcium aluminosilicate hydrate (CASH) and alkali substituted CASH gels. The CSH gel formed in the high-Ca geopolymers is comparable in structure to the one formed by hydration of the Portland cement, but with different compositions. For example, alkali activated slags usually have a lower Ca/Si in the CSH and CASH gels than the ones produced by the hydration of Portland cement.

In this invention, the term "geopolymer" refers to the hardened products from alkali activation of various reactive aluminosilicate materials such as low Ca Class F fly ash, metakaolin, blast furnace slag, Class C fly ash, natural pozzolans, and vitreous calcium aluminosilicate.

The present disclosure provides advanced geopolymer concrete compositions that can be used as a solid sensible heat storage medium for a thermal energy storage system that is capable of being operated at temperatures up to 800° C.

Embodiments of the present disclosure have developed advanced geopolymer concretes for high temperature thermal energy storage (HT-TES) systems. Key properties of the geopolymer concretes used as a HT-TES media include: (1) Specific heat capacity: high heat capacity will result in a high energy storage density per unit volume of the storage media; (2) Thermal conductivity (TC) that determines the rates of charging and discharging of a TES system. The thermal conductivity should be reasonably high and should not significantly degrade during the service life of the TES system; (3) Acid resistance. The flue gas contains acid gases (oxides of nitrogen and sulfur) as well as water vapor, which can produce an acidic condensate. Consequently, acid resistance is of interest and a high acid resistance of the concrete assures a longer service life of a thermal storage system; (4) Compressive and flexural strengths: Though only modest requirements for compressive strength, e.g., at least 1000 psi, a higher compressive strength of the concrete deems beneficial as high strength is indicative of high resistance to degradation due to thermal cycling, and (5) In addition, the coefficient of thermal expansion (CTE) of the concrete should be as close as possible to the one for stainless steel or carbon steel tubes to minimize stress caused by differential expansion or contraction of the concrete and metal piping.

It is well known that conventional geopolymer concrete better performs better than Portland cement concrete in terms of fire and acid resistances and therefore, geopolymer concretes offer two outstanding properties that are definitely needed for a concrete TES system. Besides, manufacturing geopolymer concrete uses mainly industrial waste byproducts and emits much less carbon dioxide than Portland cement concrete, which makes it green and sustainable.

Disclosed embodiments provide innovative principals to formulate mixtures that will produce TES geopolymer concretes with high thermal and mechanical performances as well as high operation temperatures. These formulations may include selection of binder materials, which form thermally stable gels, selection of fine and coarse aggregates with high thermal conductivity and CTE; optimization of alkali activator compositions with a minimum w/b: Inclusion of micro/submicron fillers to improve packing density and to reduce w/b; and use of enhancers to further improve thermal properties.

Binder Material

Examples of binder materials suitable for use in the present disclosure include Class F fly ash, metakaolin, ground granulated blast furnace slag, vitreous calcium aluminosilicate, and Class C fly ash.

Metakaolin is one of the most reactive aluminosilicate pozzolans, a finely divided material (e.g., within the range of about 0.1 to 20 microns). Metakaolin is formed by calcining purified kaolinite, generally between 650-700° C., in a rotary kiln. The mixtures of aluminum hydroxide or alumina powders (micro or submicron particles) and submicron silica particles with a similar molar $SiO_2/Al_2O_3$ ratio to metakaolin can be also included in the formulations.

Fly ash is a fine powder byproduct formed during combustion of coal. Electric power plant utility furnaces burning pulverized coal produce most of the commercially available fly ashes. These fly ashes consist mainly of glassy substantially spherical particles, as well as hematite, magnetite, unburned carbon, and some other crystalline phases formed during cooling. The American Society for Testing and Materials (ASTM) C618 standard recognizes two major classes of fly ashes for use in concrete: Class C and Class F. In the ASTM C618 standard, one major specification difference between the Class F fly ash and Class C fly ash is the lower limit of ($SiO_2+Al_2O_3+Fe_2O_3$) in the composition. The lower limit of ($SiO_2+Al_2O_3+Fe_2O_3$) for Class F fly ash is 70% and that for Class C fly ash it is 50%. Accordingly, Class F fly ashes generally have a calcium oxide content of about 15 wt. % or less, whereas Class C fly ashes generally have a higher calcium oxide content (e.g., higher than 15 wt. %, such as about 20 to 40 wt. %). High calcium oxide content makes Class C fly ashes possess cementitious properties leading to the formation of calcium silicate and calcium aluminate hydrates when mixed with water.

Depending on the chemical composition and method of production, ground granulated blast furnace slag is a glassy granular material that varies from a coarse, popcorn-like friable structure with particle size greater than about 4.75 mm in diameter, to dense, sand-size grains. Grinding reduces the particle size to cement fineness, allowing its use as a supplementary cementitious material in Portland cement-based concrete. Typical ground granulated blast furnace slag consists of about 27-38% $SiO_2$, 7-12% $Al_2O_3$, 34-43% CaO, 7-15% MgO, 0.2-1.6% $Fe_2O_3$, 0.15-0.76% MnO and 1.0-1.9% others by weight. Because GGBFS is almost 100% glassy (or amorphous), it is generally more reactive than most fly ashes. All three grades of blast furnace slag (i.e. 80, 100 and 120 by ASTM C989-92) are suitable for a TES geopolymer concrete mix. Blast furnace slag grade 120 is preferred because it exhibits the highest reactivity in alkaline solution among the three grades of slag. Furthermore, 'ultrafine' GGBFS is even more reactive compared to furnace slag grade 120. For example, MC-500® Microfine® Cement is an ultrafine furnace slag with particle sizes less than about 10 m and a specific surface area of about 800 $m^2/kg$.

Alkali-activation of a reactive aluminosilicate (binder) forms a hard geopolymer matrix that binds the ingredients into a durable stone-like material. The compositions of geopolymer gels are determined synergistically by compositions of the reactive aluminosilicate material and the alkali activator. In general, alkali-activation of aluminosilicate materials low in CaO such as Class F fly ash and metakaolin yield an alkali aluminosilicate gel (AAS) composition. Since practically there is no water in the hydrate form in the AAS structure, the materials dominated with AAS gel compositions are expected to exhibit high temperature stability.[44, 45]

In accordance with disclosed embodiments, enhanced sintering of fly ash glass particles at elevated temperatures contribute to extremely high strength retention upon exposure to elevated temperatures. Instead, alkali activation of certain high-CaO aluminosilicate materials, such as BFS, CFA and VCAS yields primarily CSH, CASH and alkali substituted CASH gels. The CSH and CASH gels formed in geopolymers are comparable in structure to the one formed by hydration of the Portland cement, but with different compositions. The geopolymers formed by alkali-activation of high-Ca aluminosilicates are expected to undergo similar reactions as Portland cement concretes do and the CSH and CASH gels are subject to the same dehydration and decomposition processes when exposed to elevated temperatures. These CSH/CASH dominated geopolymers are expected to exhibit much less thermal stability as compared to AAS dominated geopolymers. For example, alkali-activated BFS usually retains much less strength after exposure to elevated temperatures.[46, 47, 48]

In accordance with findings of the disclosed embodiments, low-Ca aluminosilicates such as low-Ca FFA and MK are the preferred binder materials for manufacturing TES geopolymer concretes with superior thermal stability. Low-Ca FFA is preferred to manufacture TES geopolymer concretes. Firstly, alkali activation of low-CaO FFA yields mainly typical geopolymer (alkali-aluminosilicate) gels free of CSH/CASH. Geopolymer gels are considered to be more stable than CSH/CASH abundant in alkali activated slag and Portland cement concretes. Secondly, fly ash geopolymer concretes cost less than those containing MK. Thirdly, alkali-activation of low-CaO FFA demands much less water than geopolymerization of MK, yielding a geopolymer gel containing less porosity. Materials with less porosity are expected to have higher thermal conductivity. Finally, FFA glass usually has a lower glass transition temperature than the glass in BFS. Sintering of FFA glass particles at elevated temperatures may benefit improving thermal performance of a geopolymer TES system. However, alkali activation of low-Ca FFA is very slow at RT and curing at elevated temperatures is required to accelerate strength development.

In one embodiment, FFA with CaO equal or less than 15 wt. % is the sole binder. In one embodiment, MK is the sole binder; In one embodiment, a composite binder is preferred composed of low-Ca FFA and MK (binary); in one embodiment, a composite binder is composed of low-Ca FFA, MK and BFS; in one embodiment, a composite binder is composed of low-Ca FFA and BFS; and in one embodiment, a composite binder is composed of MK and BFS.

The binder comprises in general about 8 to 35 wt % of a TES geopolymer concrete mix. More preferably, the binder comprises about 10 to about 20 wt. % of a TES geopolymer concrete mix.

Alkali Activator

The alkali activator is a solution of metal hydroxide and metal silicate. In one embodiment, the metal hydroxide used in the process can be an alkali metal hydroxide. The metal in the metal hydroxide can preferably be an alkali metal, sodium or potassium or both.

The metal silicate can be an alkali metal silicate and/or alkaline earth metal silicate. Alkali metal silicates, such as sodium silicate and potassium silicate. Sodium silicate is preferred due to its low cost. Sodium silicate with a mass ratio of $SiO_2/Na_2O$ equal to about 2 to 3.2 is preferred. The sodium silicate solution preferably comprises about 38 to 55 wt. % alkali silicate solids and about 45% to 62 wt. % water.

An activation solution can be prepared by diluting a commercially available alkali silicate solution with water and adding solid alkali hydroxide to adjust the solution with target concentrations of $M_2O$ (M=Na, K) and $SiO_2$ for a TES geopolymer concrete mix proportion. Alternately, silica fume, either a metallurgy waste product or synthetic product, can also be used to make the activation solution by dissolving it in an alkali hydroxide solution. Alternatively, alkali activator can be prepared as water soluble alkali silicate glass powder such as by dissolving solid alkali silicate glass powders in water. Examples of commercially available soluble alkali silicate glasses include SS® sodium silicate and Kasolv® potassium silicate from PQ Corporation.

Key parameters for alkali activator include w/b, molar $SiO_2/M_2O$ ratio (M=Na, or K or both) and molarity of MOH (M=Na, or K, or both).

An appropriate w/b ratio for an alkali activator solution is particularly important. A minimum w/b ratio for a suitable workability should always be used to ensure a minimum porosity of a hardened product and to improve mechanical and thermal performances of a TES geopolymer concrete. Otherwise, as w/b increases, both moisture content and porosity increase. Upon exposure to elevated temperatures, moisture is lost from the pores and the porous nature of concrete results in a significant decrease in thermal conductivity.

There are a few mechanisms to achieve a minimum w/b while a desirable workability is still maintained for a TES geopolymer concrete. Optimal aggregate grading will usually lead to a maximum particulate packing density of a geopolymer concrete mixture. For example, ratios of fine to coarse aggregate ratio of 0.3 to 0.6 typically result in a high packing density value for a concrete mix. In accordance with disclosed embodiments, micro and submicron particles such as ground quartz powders and silica fume may be included in a geopolymer concrete mix to improve packing density and to reduce water demand to achieve a desirable workability. In accordance with findings of the disclosed embodiments, silica fume is a super inorganic water reducer and including a few percent in a TES geopolymer concrete mix will result in a significant reduction in w/b at a desirable workability. Silica fume is a very fine pozzolanic material (submicron and nano), composed of amorphous silica produced by electric arc furnaces as a byproduct of the production of ferro-silicon alloys. In general, when a smaller w/b is achieved, compressive strength and other properties of the hardened geopolymer concrete are improved. Use of ground quartz powders, e.g. in the range of 1-20 micron size not only increases particulate packing density, in turn improve materials' mechanical performance, but also increase thermal conductivity and heat capacity, two key properties favorable for a thermal energy storage system. In accordance with findings of the disclosed embodiments, the use of superfine binder materials (FFA, BFS) reduces the w/b needed for a specific workability. For example, superfine Class F fly ashes with a mean particle size of about 2 to 10 μm may be produced by mechanical removal of coarser particles of raw fly ash or by a grinding process. Use of an intensive mixer such as planetary and twin-shaft mixers could achieve a low w/b ratio but still with a desirable workability.

The activator solution contributes to the TES geopolymer concrete mix as follows: Metal hydroxide as $M_2O$ (M=Na, K, or both) at about 1 to 8 wt. %, silicate as $SiO_2$ at about 1 to 15 wt. %, and water at 4 to 15 wt %. The alkali activator usually has a molarity of MOH (M=Na. K) ranging from about 5 to about 15, a molar ratio of $SiO_2/M_2O$ (M=Na, K) ranging from about 0.75 to about 2.00 and a w/b ranging from 0.25 to about 0.60.

Aggregates

Aggregates have the most significant effect on the thermal properties of a TES geopolymer concrete because fine and coarse aggregates occupy the majority of the concrete mass or volume. Typically, aggregates will be about 50 to 85 vol. % in a TES geopolymer concrete mix. An aggregate should possess thermal conductivity and heat capacity as high as possible for efficient charging and discharging as well as achieving high energy storage density. The aggregate should exhibit high thermal stability upon exposure to elevated temperatures such as up to 800° C. In addition, the aggregate should have a comparable CTE to the geopolymer matrix and steel pipes in a TES device, e.g., on the order of $10 \times 10^{-6}/°$ C. Table 1 summaries TC and CTE values (RT) of selected materials used in a geopolymer concrete for thermal energy storage system.

TABLE 1

TC and CTE values data (RT) of raw materials

| Materials | TC, W/(m · K) | CTE $10^{-6}/°$ C. |
|---|---|---|
| Limestone | 1.2-1.33 | 3.6-6.5 |
| Quartz sand/gravel | 3.1-7.7 | 10-13 |
| Sandstone | 2.1-3.9 | 10-12 |
| Granite | 1.73-3.98 | 5.8-9.5 |
| Basalt | 4.03 | 5.4-8.1 |
| Portland cement paste | 0.58 | 10.8-16.2 |
| Concrete | 0.9-1.3 | 7-15 |
| Aluminum Oxide | 26-40 | 16.2 |
| MgO | 62 | 24 |
| Graphite | 94 | 23.7 |
| Stainless steel 304 | 16-52 | 17.3 |
| Stainless steel 410 | | 10.5 |

Among the raw materials for fine and coarse aggregates, sands and gravel made of quartz are preferred due to their low costs, fairly high thermal conductivity and a CTE value comparable to the one for stainless steel 410 which potentially is a candidate for coiling and piping in a TES system, among all the commonly available aggregates. Basalt, quartzite and granite may be included as coarse aggregates in a TES geopolymer concrete mix.

Certain refractories and porcelains are excellent materials for sensible heat storage due to their superior properties such as high thermal conductivity, high mechanical strength and excellent thermal stability.[1, 42] Examples of these materials include silica-, magnesia- and alumina-based refractories, alumina-, alumina silicate-, and titania-based porcelains. However, it is not economical to use these materials as a thermal energy storage media due to their high materials cost. However, the waste materials of these refractories and porcelains are readily available at low cost and may be recycled into the TES geopolymer concrete. In a TES geopolymer concrete, these refractories and porcelains materials can be used as fine and/or coarse aggregates and fillers depending on their particle sizes.

Enhancer for Thermal Conductivity

The present disclosure discovers that certain enhancers for thermal conductivity and coefficient of thermal expansion are needed to develop high performance TES geopolymer concretes. Cured pure geopolymer pastes are expected to have a low thermal conductivity, e.g., on the order of 0.5

W/(m·K). In addition to inclusion of certain high-TC aggregates, disclosed embodiments provide a range of TC enhancers that are readily available to manufacture high performance concrete TES systems. One or more enhancers are included to improve thermal conductivity and thermal stability of the geopolymer concrete product as well as to compensate the geopolymer concrete for a desirable CTE. Examples of these thermal enhancers include aluminum oxide (e.g., bauxite), fused alumina, mullite, kyanite, forsterite, titania, hematite, magnetite, spinel, iron grits and nuggets, silicon carbide, graphite, graphene and carbon micro-particles. All these materials exhibit either comparable or higher TC than quartz crystals. These thermal enhancing materials are in general more expensive than quartz. Amounts of these enhancers in a TES geopolymer concrete mix depend on the overall materials cost. However, graphite and carbon micro-particles are economically viable because small dosages may make a remarkable effect on property improvement.

Moreover, fused alumina, silica carbide, metal grits and shots (copper, steel) are used as a common abrasive blast media. Spent abrasive blast media materials are low-cost thermal enhancers and can be recycled in the geopolymer concrete for TES application.

Certain metal scraps can be also recycled through incorporation in a TES geopolymer concrete as the thermal enhancers. Examples of these metal scraps include copper, brass, stainless steel, cast iron, and etc.

These thermal enhancers typically are used as a fine aggregate in a TES geopolymer concrete mix.

Enhancer for Thermal Stability

Certain enhancers may be included to specifically enhance thermal stability of a TES geopolymer concrete. Glass powders with a glass transition temperature ($T_g$) near the maximum operating temperature, e.g., 600° C., may be included in a TES geopolymer concrete mix. There will be a thermal incompatibility between geopolymer matrix and the aggregates if the geopolymer matrix has a significantly different CTE from the aggregates and other additives. The TES concrete may degradate by forming microcracks. During a thermal cycle, e.g., 300° C.-600° C.-300° C., the glass powders will become soft at the maximum operation temperature and the viscous glass may fill and heal microcracks when the temperature falls. Theoretically any glass compositions with an adequate glass transition temperature may be used. However, the glass powders should not have an adverse effect on the geopolymer concrete TES system. Examples of glass powders include silicate and borosilicate glass, and certain waste glass materials.

Alkali silicate glass powders such as potassium or sodium silicate glass powders are solid alkali activators. Examples of commercially available soluble alkali silicate glasses include SS® sodium silicate and Kasolv® potassium silicate from PQ Corporation. Upon exposure to water, the alkali-silicate glass powders dissolve to provide soluble silicate for geopolymerization. Moreover, the alkali silicate glass powders may be used as sintering aids, and at high temperatures, the glass powders are expected to react with the remaining reactive aluminosilicate particles to form additional alkali aluminosilicate materials. Such alkali aluminosilicate materials formed in situ may repair and heal any damage, if present, when a geopolymer concrete TES system is in operation at high temperatures.

Fiber

Any fibers with good thermal conductivity and thermal stability may be included in a TES geopolymer concrete mix. These fibers will improve thermal conductivity, flexural and tensile strength of the concrete, and thus improve resistance to mechanical failure. Examples of these fibers include steel fibers, copper coated steel fibers, carbon fibers, and certain ceramic fibers such as mullilte and silicon carbide. These fibers may be blended in a TES geopolymer concrete mix up to 10 wt. %.

Additionally, certain admixtures such as superplasticizers and set retarders may also be included in a TES geopolymer concrete mix to affect fresh properties of a TES geopolymer concrete.

Table 2 summarizes constituents and preferred ranges in TES geopolymer concrete mixes.

TABLE 2

| Type of materials | | Examples of raw materials | wt. % |
|---|---|---|---|
| Binder | | Class F fly ash, metakaolin, blast furnace slag | 10-35 |
| Alkali activator | | $M_2O$ (M = K, Na, or both) | 1-8 |
| | | $SiO_2$ | 2-16 |
| | | Water | 4-20 |
| Fine aggregate | | Quartz, hematite, recycled alumina and iron grits | 20-50 |
| Coarse aggregate | | Quartz, basalt, recycled refractories and porcelains | 20-60 |
| Fillers and enhancers | Micro/submicron Thermal enhancers | Quartz, alumina, silica fume Graphite, carbon micro-particles, low-$T_g$ glass, alkali-silicate glass | 0-20 |
| Fibers | | Steel, carbon, mullite, ceramic | 0-10 |

EMBODIMENTS

One embodiment described herein provides geopolymer concrete compositions for high performance thermal energy storage applications. A TES geopolymer concrete composition comprises: (i) at least one binder material; (ii) at least one alkali activator, (iii) at least one fine aggregate with high thermal conductivity and specific heat capacity, and (iv) at least one coarse aggregate with high thermal conductivity and specific heat capacity.

In some embodiments, the at least one binder material is selected from the group: class F fly ash, metakaolin, Class C fly ash, ground granulated blast furnace slag, vitreous calcium aluminosilicate, and natural pozzolans. In some embodiments, a low-Ca Class F fly ash, or metakaolin is a preferred binder material. In some embodiments, a composite binder is preferred consisting of a low-Ca Class F fly ash and metakaolin. In some embodiments, a composite binder consists of a low-Ca fly ash and blast furnace slag. In some embodiments, a composite binder consists of metakaolin and blast furnace slag. In some less favorable embodiments, the sole binder is blast furnace slag, or Class C fly ash or vitreous calcium aluminosilicate.

In some embodiments, the at least one alkali activator is a solution of a metal hydroxide and metal silicate. The metal hydroxide preferably is an alkali metal, sodium or potassium or both and the metal silicate preferably is sodium silicate, potassium silicate or both.

In some embodiments, the fine aggregate is quartz masonry or quartz concrete sand and the coarse aggregate is quartz gravel. In some embodiments, the coarse aggregate is selected from the group: quartz, basalt, granite, refractories or porcelains, and combinations thereof. In some embodiments, refractories are selected from the group: silica-, magnesia- and alumina-based and the porcelains are selected from the group: alumina-, alumina silicate-, and titania-based. In some embodiments, the aggregate is selected from the group: recycled refractories or porcelains.

In some embodiments, the fine aggregate comprises thermal enhancers with high thermal conductivity. Thermal enhancers are selected from the group: aluminum oxide (e.g., bauxite), fused alumina, mullite, kyanite, forsterite, titania, hematite, magnetite, spinel, iron grits and shots, silicon carbide, graphite, graphene, carbon micro-particles and combinations thereof. In some embodiments, the fine aggregate comprises quartz sand and at least one thermal enhancer. In some embodiments, the at least one thermal enhancers are selected from recycled sandblasting alumina, iron grits and shots and recycled metal scraps. In some embodiments, the recycled metal scrap is selected from the group: copper, brass, cast iron, and stainless steel.

In some embodiment, the TES geopolymer concrete mix further comprises glass powders with a glass transition temperature of about 500 to about 700° C. In some embodiment, the concrete mix further comprises potassium or sodium silicate powders.

In some embodiments, the TES geopolymer concrete mix further comprises micro and submicron fillers, selected from the group, ground quartz powder, silica fume, alumina.

In some embodiments, the TES geopolymer concrete mix further comprises thermally conductive fibers selected from steel fibers, copper coated steel fibers, carbon fibers, and certain ceramic fibers such as mullilte and silicon carbide.

One embodiment described herein provides geopolymer concrete compositions for high performance thermal energy storage applications. A TES geopolymer concrete composition comprises: (i) Class F fly ash having less than or equal to 8 wt. % of calcium oxide; (ii) at least one aqueous alkali silicate activator, (iii) at least one fine aggregate with high thermal conductivity and specific heat capacity, and (iv) at least one coarse aggregate with high thermal conductivity and specific heat capacity. In this embodiment, the solid mixture of binder, fine and coarse aggregates, other additives, if any, are mixed with at least one aqueous alkali silicate activator solution, poured into the mold of the TES device and cured at temperatures above 45° C., preferably between about 60° C. and about 85° C. for about 12 to 48 hours at a relative humidity higher than 90%.

Another embodiment described herein provides geopolymer concrete compositions for thermal energy storage application. A geopolymer concrete composition comprises: (i) Class F fly ash having less than or equal to 8 wt % of calcium oxide; (ii) metakaolin; (iii) at least an aqueous alkali silicate activator, (iv) at least one fine aggregate with high thermal conductivity and specific heat capacity, and (v) at least one coarse aggregate with high thermal conductivity and specific heat capacity. The geopolymer concrete has a curing temperature between about 20° C. and about 85° C. In some embodiments, the FFA/MK mass ratio ranges from about 0.1 to about 10, and more preferably from about 1.5 to about 9.

Another embodiment described herein provides geopolymer concrete compositions for thermal energy storage application. A geopolymer concrete composition comprises: (i) Class F fly ash having less than or equal to 8 wt. % of calcium oxide; (ii) at least one high Ca aluminosilicate binder selecting from the group: blast furnace slag, class C fly ash, and vitreous calcium aluminosilicate; (iv) at least one fine aggregate with high thermal conductivity and specific heat capacity, and (v) at least one coarse aggregate with high thermal conductivity and specific heat capacity. The geopolymer concrete has a curing temperature between about 20° C. and about 85° C. In some embodiments, the FFA/high-Ca binder mass ratio preferably ranges from about 2.3 to about 9. More preferably the FFA/high-Ca binder ratio ranges from about 3.5 to about 9 in favor of incorporating Ca in the AAS gel, rather than CASH gel.

In one embodiment, the fine aggregates are selected from the group: quartz sand, alumina sand, fused alumina, bauxite, magnetite, magnesia, spinel, kyanite, rutile, natural graphite, graphene, micro-carbon particles, recycled alumina and steel or iron shots for sandblasting, and recycled metal scraps, and the coarse aggregate from the group: quartz gravel, granite, basalt, diorite, quartzite, recycled porcelains, and recycled refractories.

In one embodiment, a geopolymer concrete mix for thermal energy storage application further includes certain thermally conductive fibers, selected from the group: steel fibers, copper coated steel fibers, silicon carbide fibers, and carbon fibers.

In one embodiment, a geopolymer concrete mix for thermal energy storage application further includes micro and submicron fillers, selected from the group: ground quartz powder, silica fume, hematite, and alumina.

One embodiment described herein provides geopolymer concrete compositions for high performance thermal energy storage applications. A TES geopolymer concrete mix comprises about 8 to about 35 wt. % of at least one binder material, about 1 to about 8 wt % alkali oxides, about 2 to about 16 wt. % soluble silicate, about 4 to about 20 wt % water, about 20 to about 50 wt. % fine aggregate, about 20 to about 60 wt. % coarse aggregate, up to 30 wt. % fillers, and about 15 wt. % thermally conductive fiber, whereas the alkali oxides, soluble silicate and water constitute the alkali activator.

Another embodiment provides a TES geopolymer concrete composition for thermal energy storage application, which has a compressive strength of at least about 1500 psi, a thermal conductivity of at least about 1 W/(m·K), and a specific heat capacity of at least about 1 MJ/m$^3$/K after heat treatment at 600° C. for 6 hours.

The following examples illustrate the invention. These examples are in no way intended to limit the scope of the methods.

EXAMPLES

The following examples will illustrate the practice of the present disclosure in its preferred embodiments.

Two Class F fly ashes were used to prepare TES geopolymer concrete. One was a low CaO (6.49%) FFA from Jim Bridger Power Station, Montana, with an LOI of ~0.41%. Its sum of Si+Al+Fe oxides was 83.90%. The second fly ash was a low CaO (4.77%) FFA from Navajo Power Station, NV with an LOI of ~0.15%. Its sum of Si+Al+Fe oxides was 87.00%. Both fly ashes came from Headwaters Resources. The BFS grade 120 came from the Lafarge-Holcim's Sparrow Point plant in Baltimore, Md. The activity index was about 129 according to ASTM C989. The blast furnace slag contained about 38.5% CaO, 38.2% SiO$_2$, 10.3% Al$_2$O$_3$, and 9.2% MgO with a mean particle size of 13.8 μm and 50 vol. % less than 7 am. Metakaolin (Kaorock) came from Thiele Kaolin Company, Sandersville, Ga.

Fused alumina (16 grits) came from Industrial Supply Inc, ID, graphite flakes (medium) from Asbury Carbons, Asbury, N.J., and micro steel fiber (13 mm/0.4 mm) from Bekaert (www.bekaert.com). Quartz concrete sand and quartz gravel (maximum ⅜" were used as aggregates. Silica fume came from Norchem, Inc (www.norchem.com).

Type Ru sodium silicate solution from PQ, Corp was used to prepare alkali silicate activator solutions. The mass ratio of $SiO_2/Na_2O$ was about 2.40. The solution, as received, contained about 13.9 wt. % $Na_2O$, 33.2 wt. % $SiO_2$ and 52.9 wt. % water.

Sample Preparation and Measurements

Alkali activator solutions were prepared at least 12 hours before preparation of a geopolymer concrete. The activator solution was prepared by dissolving 99% pure NaOH beads and/or KOH (91% pure) flakes in tap water and then mixed with Type Ru sodium silicate liquid from PQ Corp. A retarder solution was used to prepare the high-performance concrete sample. The retarder compound was dissolved in tap water in a separate container and then the retarder solution was mixed with the activator solution, about 30 minutes before geopolymer sample preparation.

Fine quartz sands and pea gravel were treated to be at saturated surface dry (SSD) condition. FFA, BFS and SSD fine sand, micro steel fibers, and other ingredients if any such as fused alumina sands, graphite flakes or silica fume were mixed in a 20 L K-Lab mixer (Kercher Industries, PA) and then the activator solution with the retarder, if any, was poured into the dry mixture and mixed for 3 minutes at about 250 rpm for both, the mixing blades and the mixing container. The mixing container was in a counter rotating direction. Finally, quartz gravel was added to the paste and mixing continued for another 3 minutes at a lower speed, e.g., about 100 to 150 rpm. The batch size was about 14 kg.

The fresh concrete was measured for slump about 10 min after mixing according to ASTM C143. The fresh concrete was poured into 3"x 6" and 4"×8" cylindrical molds, rodded and vibrated on a vibration table for 3 minutes to remove air bubbles. Pilot pins for sensors for thermal conductivity and heat capacity were appropriately installed in the 4" cylindrical sample. The pins were removed after enough strength in the concrete sample developed to maintain the openings. The cylindrical samples were cured at RT (22° C. to 27° C.), 65° C. or 80° C. All the samples were cured in their molds with lids on until samples were demoulded for testing. Set times were estimated for all fresh concrete samples.

Compressive strength was measured on 3"×6" cylindrical samples on a Test Mark compression machine CM-4000-SD.

Thermal conductivity and specific heat capacity of the concrete samples were measured on a 4"×8" cylindrical sample with KD2 Pro SH-1 sensor (METER Group, USA). In addition, thermal conductivity was measured with KD2 Pro TR-1 sensor (METER Group, USA). All thermal properties were determined according to ASTM D5334.

Stepwise heat treatments (HT): 4"×8" cylindrical samples were subject to the following stepwise heat treatment procedures: i.) Samples were demolded after curing for 27 days; ii.) The samples were oven dried at 105° C. for at least 12 h to remove moisture; iii.) The samples were further heat treated at 550° C. or 600° C. (heated at 1° C./min and kept at the maximum temperature for 6 h and then cooled naturally to near RT). In total, the samples were exposed to temperatures above 400° C. for at least for 10 h. The thermal conductivity and specific heat capacity were measured before and after each of the heat treatment steps.

Thermal cycling tests: Some concrete samples were further subject to up to 25 thermal cycles between 300° C. and 550° C. or 300° C. and 600° C. A thermal cycling test included 4 or 5 testing segments and each segment included 5 thermal cycles. Each thermal cycle included heating the sample to the maximum temperature (550° C. or 600° C.) in 1.5 h, leaving it at the maximum temperature for 1 h, cooling it to 300° C. in about 4 h and leaving it at 300° C. for 1 h (FIG. 1). After the thermal cycling test was completed, compressive strength and thermal conductivity were measured at RT.

Examples #1 to #4

Geopolymer concretes mix proportions for Examples #1 to #4 are shown in Table 3. The formulations contained about 30 kg/m³ of steel fiber. Total aggregates were about 78.75 wt. % with a coarse to fine mass ratio of 1.74. Examples #1 and #2 are binary FFA/MK geopolymers, whereas Examples #3 and #4 are binary FFA/BFS geopolymers. FFA is a Navajo fly ash. Examples #2 and #4 included about 30% fused alumina sands, which replaced quartz sands and additionally about 12 kg/m³ graphite flakes. Alumina sand and graphite were thermal enhancers due to their high thermal conductivity. The geopolymer concrete samples were initially cured at 65° C. for 24 h.

TABLE 3

Binary geopolymer concrete mix compositions

| Example | % FFA | % MK | % BFS | w/b | NaOH | $SiO_2/Na_2O$ | Alumina | Graphite |
|---|---|---|---|---|---|---|---|---|
| #1 | 70 | 30 | — | 0.54 | 9M | 1.45 | — | — |
| #2 | 70 | 30 | — | 0.54 | 9M | 1.45 | 30% | 0.5% |
| #3 | 90 | — | 10 | 0.40 | 9M | 1.25 | — | — |
| #4 | 90 | — | 10 | 0.40 | 9M | 1.25 | 30% | 0.5% |

TABLE 4

Slump for fresh concrete and compressive strength after each heat treatment step

| | | | Compressive strength | |
|---|---|---|---|---|
| Mix ID | Slump | Prior to HT | After 20 cycles (300/600° C.) | After 25 cycles (300/550° C.) |
| #1 | 4" | 6342 psi | 1683 psi | — |
| #2 | 2" | 6414 psi | 1553 psi | 2145 psi |
| #3 | 7½" | 7057 psi | 1305 psi | — |
| #4 | 4½" | 7232 psi | 1381 psi | 2198 psi |

TABLE 5

Thermal conductivity and specific heat capacity before and after heat treatment at 600° C.

| | Prior to HT | | After 600° C./6 h | |
|---|---|---|---|---|
| Example | W/(m · K) | MJ/(m³ · K) | W/(m · K) | MJ/(m³ · K) |
| #1 | 3.701 | 2.646 | 1.424 | 1.734 |
| #2 | 5.063 | 3.724 | 1.776 | 2.261 |
| #3 | 4.019 | 3.865 | 1.782 | 2.554 |
| #4 | 4.908 | 2.913 | 1.636 | 2.359 |

The test results for examples #1 to #4 are shown in Tables 4 and 5. The ASTM slump ranged from 2" to 7.5" (Table 4). Addition of graphite flakes and alumina sands decreased ASTM slump (Example #2 vs. #1 and Example #4 vs. #3, respectively), most probably due to flake-type graphite.

Geopolymer concretes (FFA/MK binary) for Examples #1 and #2 cured at 65° C. showed a similar 28-day compressive strength, at around 6400 psi. After 20 thermal cycles between 300 and 600° C., the residual compressive strengths for Example #1 and #2 were about 1600 psi. After samples were subject to 25 thermal cycles between 250 and 550° C., the residual compressive strength of Example #2 stayed higher, about 2150 psi (Table 4). Table 5 summarized the testing results on thermal properties. Before heat treatment, the thermal conductivity and heat capacity of Example #1 were about 3.70 W/(m·K) and 2.65 MJ/(m³·K), respectively. After heat treatment at 600° C./6 h, the thermal conductivity and heat capacity were 1.42 W/(m·K) and 1.73 MJ/(m³·K), respectively. When the thermal enhancers fused alumina and graphite were included in Example #2, the thermal conductivity and heat capacity increased to 5.06 W/(m·K) and 3.72 MJ/(m³·K), respectively, before heat treatment. After heat treatment at 600° C./6 h, the thermal conductivity and heat capacity were 1.78 W/(m·K) and 2.26 MJ/(m³·K), respectively.

Geopolymer concretes (FFA/BFS binary) in Examples #3 and #4 cured at 65° C. showed similar 28-day compressive strength, about 7000 psi (Table 4). After 20 thermal cycles between 300 and 600° C., the residual compressive strength was about 1305 psi for Example #3 and 1381 psi for Example #4. After the sample of Example #4 was subject to 25 thermal cycles between 250 and 550° C., the residual compressive strength was 2198 psi (Table 4). Before heat treatment the thermal conductivity and heat capacity of Example #3 were about 4.02 W/(m·K) and 3.87 MJ/(m³·K), respectively. After heat treatment at 600° C./6 h, the thermal conductivity and heat capacity were 1.64 W/(m·K) and 2.36 MJ/(m³·K), respectively. When the thermal enhancers fused alumina and graphite were included in Example #4, the thermal conductivity and heat capacity increased to 4.91 W/(m·K) and 2.91 MJ/(m³·K), respectively, before heat treatment. After heat treatment at 600° C./6 h, the thermal conductivity and heat capacity were 1.78 W/(m·K) and 2.55 MJ/(m³·K), respectively (Table 5). These examples demonstrate that thermal enhancers improve thermal conductivity and heat capacity of a geopolymer concrete for TES.

Examples #5 and #6

Geopolymer concretes of Examples #1 to #2 shown in Table 3 were cured only at room temperature, yielding Example #5 and #6. 28-day compressive strength for Example #5 was 6409 psi and 2297 psi after heat treatment at 600° C./6 h. Inclusion of fused alumina sand and graphite flakes in Example #5 yielded Example #6. 28-day compressive strength for Example #6 was 6571 psi and 2049 psi after heat treatment at 600° C./6 h. Prior to heat treatment, the thermal conductivity and heat capacity of Example #5 were about 3.74 W/(m·K) and 2.35 MJ/(m³·K), respectively. After heat treatment at 600° C./6 h, the thermal conductivity and heat capacity were 1.56 W/(m·K) and 1.77 MJ/(m³·K), respectively.

The thermal enhancers fused alumina and graphite were included in the mix of Example #5, yielding Example #6. Again, all the samples for Example #6 were cured only at RT. The thermal conductivity and heat capacity of Example #6 increased to 4.29 W/(m·K) and 3.39 MJ/(m³·K), respectively, before heat treatment, compared to Example #5 without thermal enhancers. The thermal conductivity and heat capacity were 1.77 W/(m·K) and 2.47 MJ/(m³·K), respectively after heat treatment at 600° C./6 h. The sample after heat treatment at 600° C./6 h was further subject to thermal cycling at between 300 and 600° C. After 5 thermal cycles at a maximum temperature of 600° C., the thermal conductivity decreased to 1.54 W/(m·K) and the specific heat capacity to 2.29 MJ/(m³·K). After 10 cycles, the thermal conductivity decreased to 1.45 W/(m·K) and specific heat capacity to 2.27 MJ/(m³·K). After 15 cycles, the thermal conductivity decreased further to about 1.28 W/(m·K) and specific heat capacity remained at 2.30 MJ/(m³·K). Results from Examples #5 and #6 again demonstrate that thermal enhancers improve thermal conductivity and heat capacity of a geopolymer concrete for TES.

Examples #7 to #9

Concrete mix compositions for Examples #7 to #9 are shown in Table 6. The formulations contained additionally 30 kg/m³ of steel fiber. Total aggregates were about 78.75 wt. % with a coarse to fine mass ratio of 1.74. Example #7 and #8 are based on a binary FFA/BFS geopolymer composition and Example #9 was as binary BFS/MK geopolymer composition with 72% BFS and 28% MK. All the samples for Examples #7 to #9 were cured at RT.

TABLE 6

Binary FFA/BFS geopolymer concrete mix compositions

| Mix ID | % FFA | % MK | % BFS | w/b | NaOH | SiO₂/Na₂O | Slump | Set time |
|---|---|---|---|---|---|---|---|---|
| #7 | 85 | — | 15 | 0.40 | 9M | 1.25 | 4" | >4 h |
| #8 | 75 | — | 25 | 0.40 | 9M | 1.25 | 2" | >3 h |
| #9 | — | 28 | 72 | 0.52 | 8.5M | 1.21 | 8" | 1.5 h |

28-day compressive strength for Example #7 was 5865 psi and 1447 psi after heat treatment at 600° C./6 h (Table 7). Increasing BFS from 15% in Example #7 to 25% yielded Example #8. 28-day compressive strength for Example #8 was 6624 psi and 1683 psi after heat treatment at 600° C./6 h. 28-day compressive strength for Example #8 was 12,500 psi and 1429 psi after heat treatment at 600° C./6 h (Table 5). Test results of Example #9 demonstrate that a geopolymer concrete with a high BFS content may exhibit a relatively low thermal stability after exposure to high temperatures, due to excessive CASH gel formation.

Prior to heat treatment, the thermal conductivity and heat capacity of Example #7 were 2.93 W/(m·K) and 1.87 MJ/(m³·K), respectively. After heat treatment at 600° C./6 h, the thermal conductivity and heat capacity were 1.37 W/(m·K) and 1.51 MJ/(m³·K), respectively. Prior to heat treatment, the thermal conductivity and heat capacity of Example #8 were 3.92 W/(m·K) and 2.64 MJ/(m³·K), respectively. After heat treatment at 600° C./6 h, the thermal conductivity and heat capacity were 1.25 W/(m·K) and 2.12 MJ/(m³·K), respectively. Prior to any heat treatment, the thermal conductivity and heat capacity for Example #9 were 3.36 W/(m·K) and 2.08 MJ/(m³·K), respectively. After heat treatment at 600° C./6 h, the thermal conductivity and heat capacity were 1.32 W/(m·K) and 1.93 MJ/(m³·K), respectively (Table 7).

TABLE 7

Compressive strength, thermal conductivity and specific heat capacity of TES geopolymer concretes

| | Compressive strength | | Prior to HT | | After 600° C./6 h | |
|---|---|---|---|---|---|---|
| Example | Prior to HT | After 600° C./6 h | W/(m · K) | MJ/(m³ · K) | W/(m · K) | MJ/(m³ · K) |
| #7 | 5865 psi | 1447 psi | 2.930 | 1.872 | 1.373 | 1.510 |
| #8 | 6624 psi | 1638 psi | 3.918 | 2.641 | 1.245 | 2.115 |
| #9 | 12500 psi | 1429 psi | 3.364 | 2.079 | 1.323 | 1.926 |

Examples #10 to #15

Concrete mix compositions and compressive strength results for Examples #10 to #15 are shown in Table 8. All examples contain Navajo fly ash, except Example #12, which contained Jim Bridger fly ash. The formulations contained additionally 30 kg/m³ of steel fiber. Total aggregates were about 78.75 wt. % with a coarse to fine mass ratio of 1.74. These examples demonstrate suitability of low-Ca fly ash based geopolymer concretes as a solid sensible thermal energy storage medium.

TABLE 8

Fly ash geopolymer concrete composition, slump and compressive strength

| | | | | | Compressive strength | |
|---|---|---|---|---|---|---|
| Example | w/b | NaOH | SiO₂/Na₂O | Slump | Prior to HT | After 600° C./6 h |
| #10 | 0.40 | 9M | 1.25 | 4" | 8250 psi | 2481 psi |
| #11 | 0.40 | 10M | 1.50 | 8" | 5718 psi | 2460 psi |
| #12 | 0.40 | 10M | 1.50 | 8" | 5732 psi | 2025 psi |
| #13 | 0.40 | 10M | 1.50 | 6" | 8477 psi | 2081 psi |
| #14 | 0.35 | 10M | 1.50 | 4" | 7389 psi | 2297 psi |
| #15 | 0.30 | 10M | 1.50 | 2" | 9581 psi | 3294 psi |

Fly ash geopolymer concretes of Examples #10 to #15 had a set time of about 16 h to 24 h at RT. Alkali-activation of low-Ca FFA usually is extremely slow at ambient temperatures and accelerated curing at elevated temperatures is required to manufacture hardened concrete products. Therefore, all the samples were cured at 65° C. for 48 h except the samples of Example #13 that were cured at 80° C. for 24 h.

Slump decreased with decreasing w/b (Table 8). For example, when w/b=0.4, the slump was 6" (Example #13). When w/b decreased to 0.35, the slump was 4" (Example #14) and when w/b decreased to 0.30, the slump was about 2" (Example #15).

Example #10 is a mix with w/b=0.4, 9M NaOH and SiO₂/Na₂O=1.25. the 28-day compressive strength for Example #10 was 8250 psi and 2481 psi after heat treatment at 600° C./6 h, i.e., retention of strength was 30%. Addition of about 1 wt. % potassium silicate glass powders, increasing NaOH to 10M and SiO₂/Na₂O to 1.5, respectively in the concrete mix as in Example #10, yielded Example #11. The 28-day compressive strength for Example #11 was 5718 psi and 2460 psi after heat treatment at 600° C./6 h, i.e., retention of strength was 43%. This example demonstrates that alkali silicate glass powders may serve as a sintering aid to improve strength retention. Example #12 is a mix with w/b=0.4, 10M NaOH and SiO₂/Na₂O=1.5. The 28-day compressive strength for Example #12 was 5732 psi and 2051 psi after heat treatment at 600° C./6 h with strength retention of 35%. Example #13 contained Navajo fly ash but with the same mix composition as Example #12. The samples were cured at 80° C. for 24 h the at RT. The 28-day compressive strength was 8477 psi and the compressive strength became 2081 psi after heat treatment at 600° C./6 h with strength retention of 25%. Example #14 had the same mix composition as Example #13, but a w/b of 0.35. The 28-day compressive strength was 7389 psi and 2297 psi after heat treatment at 600° C./6 h with strength retention of 31%. The w/b ratio was further decreased to 0.30 in Example #15. The 28-day compressive strength was 9581 psi and 3294 psi after heat treatment at 600° C./6 h with strength retention of 34%.

Table 9 summarizes the results for thermal conductivity and specific heat capacity. Prior to heat treatment, the thermal conductivity and heat capacity of Example #10 were 3.99 W/(m·K). After heat treatment at 600° C./6 h, the thermal conductivity was 1.46 W/(m·K). Prior to heat treatment, thermal conductivity and heat capacity of Example #11 were 3.33 W/(m·K) and 1.96 MJ/(m³·K), respectively. After heat treatment at 600° C./6 h, thermal conductivity and heat capacity were 1.48 W/(m·K) and 1.68 MJ/(m³·K), respectively. Prior to heat treatment, thermal conductivity and heat capacity of Example #12 were 3.92 W/(m·K) and 2.52 MJ/(m³·K), respectively. After heat treatment at 600° C./6 h, thermal conductivity and heat capacity were 1.52 W/(m·K) and 2.15 MJ/(m³·K), respectively. Prior to heat treatment, thermal conductivity and heat capacity of Example #13 were 3.60 W/(m·K) and 2.90 MJ/(m³·K), respectively. After heat treatment at 600° C./6 h, the thermal conductivity and heat capacity were 1.53 W/(m-K) and 2.18 MJ/(m³·K), respectively. Prior to heat treatment, thermal conductivity and heat capacity for Example #14 were 3.32 W/(m-K) and 2.66 MJ/(m³·K), respectively. After heat treatment at 600° C./6 h, the thermal conductivity and heat capacity were 1.75 W/(m-K) and 2.20 MJ/(m³·K), respectively. Prior to heat treatment, the thermal conductivity and heat capacity for Example #15 were 3.15 W/(m·K) and 2.10 MJ/(m³·K), respectively. After heat treatment at 600° C./6 h, the thermal conductivity and heat capacity were 1.72 W/(m·K) and 1.91 MJ/(m³·K), respectively. These examples demonstrate that a low w/b ratio allows us to prepare TES geopolymer concretes with high thermal conductivity and specific heat capacity as well as high mechanical stability when exposed to high temperatures.

TABLE 9

Thermal properties of fly ash geopolymer concrete

| | Prior to HT | | After 600° C. | |
|---|---|---|---|---|
| Example | W/(m · K) | MJ/(m³ · K) | W/(m · K) | MJ/(m³ · K) |
| #10 | 3.99 | N/A | 1.46 | N/A |
| #11 | 3.33 | 1.96 | 1.48 | 1.68 |
| #12 | 3.92 | 2.52 | 1.52 | 2.15 |
| #13 | 3.60 | 2.90 | 1.53 | 2.18 |
| #14 | 3.32 | 2.66 | 1.75 | 2.20 |
| #15 | 3.15 | 2.10 | 1.72 | 1.91 |

REFERENCES

The following references are referred to above and are incorporated herein by reference:
1. Gil, M. Medrano, I. Martorell, A. Lazaro, P. Dolado, B. Zalba, L. F. Cabeza, State of the art on high temperature thermal energy storage for power generation. Part 1—Concepts, materials and modellization, Renewable and Sustainable Energy Reviews 14 (2010) 31-55.
2. S. Kuravi, J. Trahan, D. Y. Goswami, M. M. Rahman, E. K. Stefanakos, Thermal energy storage technologies and systems for concentrating solar power plants, Progress in Energy and Combustion Science 39 (2013) 285-319.
3. U. Herrmann and D. Kearney, Survey of Thermal Energy Storage for Parabolic Trough Power Plants, ASME Journal of Solar Energy Engineering 124 (2002) 145-152.
4. H. L. Zhang, J. Baeyens, G. Caceres, J. Degreve, Y. Q. Lu, Thermal energy storage: Recent developments and practical aspects, Progress in Energy and Combustion Science 53 (2016) 1-40.
5. K. S. do Couto Aktay, R. Tamme, H. Miiller-Steinhagen, Thermal Conductivity of High-Temperature Multicomponent Materials with Phase Change, International Journal of Thermophysics 29 (2008) 678-692.
6. E. John, M. Hale, P. Selvam, Concrete as a thermal energy storage medium for thermocline solar energy storage systems, Solar Energy, 96 (2013) 194-204.
7. R. Tiskatine, A. Aharoune, L. Bouirden, A. Ihlal, Identification of suitable storage materials for solar thermal power plant using selection methodology, Applied Thermal Engineering 117 (2017) 591-608.
8. R. Tamme, D. Laing, W.-D. Steinmann, Advanced thermal energy storage technology for parabolic trough Proceedings of 2003 International Solar Energy Conference, Hawaii, 15-18 Mar. 2003.
9. D. Laing, W.-D. Steinmann, R. Tamme, C. Richter, Solid Media Thermal Storage for Parabolic Trough Power Plants, Solar Energy 80 (2006) 1283-1289.
10. D. Laing, W.-D. Steinmann, M. Fiss, R. Tamme, T. Brand, C. Bahl, Solid Media Thermal Storage Development and Analysis of Modular Storage Operation Concepts for Parabolic Trough Power Plants, ASME Journal of Solar Energy Engineering, 130 (2008) 011006.
11. D. Laing, D. Lehmann, M. Fiss, C. Bahl, 2009, Test Results of Concrete Thermal Energy Storage for Parabolic Trough Power Plants, ASME Journal of Solar Energy Engineering 131 (2009) 041007.
12. D. Laing, C. Bahl, T. Bauer, D. Lehmann, W. D. Steinmann, Thermal energy storage for direct steam generation, Solar Energy 85 (2011) 627-633.
13. D. Laing, C. Bahl, T. Bauer, M. Fiss, N. Breidenbach, M. Hempel, High-Temperature Solid-Media Thermal Energy Storage for Solar Thermal Power Plants, Proceedings of the IEEE 100 (2012) 516-524.
14. V. A. Salomoni, C. E. Majorana, G. M. Giannuzzi, A. Miliozzi, R. Di Maggio, F. Girardi, D. Mele, M. Lucentini, Thermal storage of sensible heat using concrete modules in solar power plants, Solar Energy 103 (2014) 303-315.
15. C Ferone, F Colangelo, D Frattini, G Roviello, R Cioffi, R. di Maggio, Finite element method modeling of sensible heat thermal energy storage with innovative concretes and comparative analysis with literature benchmarks, Energies 7 (2014) 5291-5316.
16. Y. Jian, F. Bai, Q. Falcoz, Z. Wang, Control Strategy of the module concrete thermal energy storage for parabolic trough power plants, Energy Procedia 69 (2015) 891-899.
17. H. Niyas, L. Prasad, P. Muthukumar, Performance investigation of high-temperature sensible heat thermal energy storage system during charging and discharging cycles, Clean Technology and Environmental Policy 17 (2015) 501-513.
18. R. Boonsu, S. Sukchai, S. Hemavibool, S. Somkun, Performance Analysis of Thermal Energy Storage Prototype in Thailand, Journal of Clean Energy Technologies 4 (2016) 101-106.
19. P. Kalifa, F. D. Menneteau, D. Quenard, Spalling and pore pressure in HPC at high temperatures, Cement and Concrete Research 30 (2000) 1915-1927
20. V. Kodur and W. Khaliq, Effect of temperature on thermal properties of different types of high-strength concrete, Journal of Materials in Civil Engineering 23 (2011) 793-801.
21. D. Cree, M. Green, A. Noumowd, Residual strength of concrete containing recycled materials after exposure to fire: A review, Construction and Building Materials 45 (2013) 208-223.
22. V. Kodur, Properties of concrete at elevated temperatures, ISRN Civil engineering (2014) 1-15.
23. Q. M. Ma, R. X. Guo, Z. M. Zhao, Z. W. Lin, K. C. He, Mechanical properties of concrete at high temperature—A review, Construction and Building Materials 93 (2015) 371-383.
24. K. D. Hertz, Limits of spalling of fire-exposed concrete, Fire Safety Journal 38 (2003) 103-116.
25. J. C. Mindeguia, P. Pimienta, A. Noumowd, M. Kanema, Temperature, pore pressure and mass variation of concrete subjected to high temperature—Experimental and numerical discussion on spalling risk, Cement and Concrete Research 40 (2010) 477-487.
26. L. T. Phanl, J. R. Lawson and F. L. Davis, Effects of elevated temperature exposure on heating characteristics, spalling, and residual properties of high performance concrete, Materials and Structures 34 (2001) 83-91.
27. J. Zhao, J.-J. Zheng, G.-F. Peng, and K. van Breugel, A meso-level investigation into the explosive spalling mechanism of high-performance concrete under fire exposure, Cement and Concrete Research 65 (2014) 64-75.
28. S. S. M. Tehrani, R. A. Taylor, K. Nithyanandam, A. S. Ghazani, Annual comparative performance and cost analysis of high temperature, sensible thermal energy storage systems integrated with a concentrated solar power plant, Solar Energy 153 (2017) 153-172.
29. M. Martins, U. Villalobos, T. Delclos, P. Armstrong, P. G. Bergan, N. Calvet, New concentrating solar power facility for testing high temperature concrete thermal energy storage, Energy Procedia 75 (2015) 2144-2149.
30. B. A. Graybeal, Material Property Characterization of Ultra-High Performance Concrete, Federal Highway Administration, Publication Number: FHWA-HRT-06-103, 2006
31. E. E. John, W. M. Hale, R. P. Selvam, Effect of High Temperatures and Heating Rates on High Strength Concrete for Use as Thermal Energy Storage, ASME 2010 4th International Conference on Energy Sustainability, Volume 2, Phoenix, Ariz., USA, May 17-22, (2010).
32. J. E. Skinner, M. N. Strasser, B. M. Brown and R. P. Selvam, Testing of high-performance concrete as a thermal energy storage medium at high temperatures, ASME Journal of Solar Energy Engineering 136 (2014) 021004.
33. S. Aydln, B. Baradan, High Temperature Resistance of Alkali-activated slag- and Portland Cement-Based Reactive Powder Concrete, ACI Materials Journal 109 (2012) 463-470.
34. M. C. Alonso, J. Vera-Agullo, L. Guerreiro, V. Flor-Laguna, M. Sanchez, M. Collares-Pereira, Calcium aluminate based cement for concrete to be used as thermal energy storage in solar thermal electricity plants, Cement and Concrete Research 82 (2016) 74-86.
35. P. Duxson, F. Fernandez-Jimmenez, J. L. Provis, G. C. Lukey, A. Palomo, and J. S. J. van Deventer, Geopolymer technology: The current state of the art, Journal of Materials Science 42 (2007) 2917-2933.
36. J. Davidovits, Geopolymer Chemistry and Applications, 4th edition, Geopolymer Institute, France, (2015).
37. J. L. Provis, J. S. J. van Deventer, Alkali Activated Materials, State-of-the-Art Report, RILEM TC 224-AAM, Springer, Heidelberg, N.Y., (2014)
38. J. L. Provis and S. A. Bernal, Geopolymers and Related Alkali-Activated Materials, Annual Review in Materials Research 44 (2014) 299-327.
39. F. Pacheco-Torgal, J. Labrincha, C. Leonelli, A. Palomo and P. Chindaprasit, Handbook of Alkali-activated Cements, Mortars and Concretes, Woodhead Publishing Series in Civil and Structural Engineering, Elsevier Ltd (2014) 852
40. L. Vickers, A. van Riessen, W. D. A. Rickard, Fire-Resistant Geopolymers: Role of Fibres and Fillers to Enhance Thermal Properties, SpringerBriefs in Materials, Springer Singapore Heidelberg, N.Y., Dordrecht, London, (2015) 127.
41. H-C. Shin and Y. Chung, Determination of coefficient of thermal expansion: Effects on Louisiana's PCC pavement design, Technical report FHWA/LA.11/451 (2011).
42. S. Khare, M. Dell'Amico, C. Knight, and S. McGarry, Selection of materials for high temperature latent heat energy storage, Solar Energy Materials and Solar Cells 107 (2012) 20-27.
43. A. A. Adeyanju, Effects of Pressure and Friction Parameters on a Concrete Bed Energy Storage System, Energy Technology and Policy 2 (2015) 1-9.
44. T. Bakharev, Thermal behaviour of geopolymers prepared using class F fly ash and elevated temperature curing, Cement and Concrete Research 36 (2006) 1134-1147.
45. W. D. A Rickard, R. Williams, J. Temuujin, A. van Riessen, Assessing the suitability of three Australian fly ashes as an aluminosilicate source for geopolymers in high temperature applications, Materials Science and Engineering A528 (2011) 3390-3397.
46. M. Guerrieri, J. Sanjayan, F. Collins, Residual strength properties of sodium silicate alkali activated slag paste exposed to elevated temperatures, Materials and Structures 43 (2010) 765-773.
47. S. A. Bernal, E. D. Rodriguez, R. M. de Gutierrez, M. Gordillo, J. L. Provis, Mechanical and thermal characterisation of geopolymers based on silicate-activated metakaolin/slag blends, Journal of Materials Science 46 (2011) 5477-5486.
48. Z. Pan, Z., Tao, Z., Cao, Y., Bajracharya, N., Murphy, T. D., & Wuhrer, R. (2016). Comparative performance of alkali-activated slag and fly ash at elevated temperatures (H. Hao & C. Zhang, Eds.), Proceedings of the 24th Australasian Conference on the Mechanics of Structures and Materials (ACMSM24), Perth, Australia, 6-9 December (2016) 415-420.
49. A. M. Rashad, S. R. Zeedan, The effect of activator concentration on the residual strength of alkali-activated fly ash pastes subjected to thermal load, Construction and Building Materials 25 (2011) 3098-3107.
50. P. Rovnanik, P. Bayer, P. Rovnanikovi, Characterization of alkali activated slag paste after exposure to high temperatures, Construction and Building Materials 47 (2013) 1479-1487.
51. Fernandez-Jimenez, J. Y. Pastor, A. Martin, A. Palomo, High-temperature resistance in alkali-activated cement, Journal of the American Ceramic Society 93 (2010) 3411-3417.
52. D. L. Y. Kong, J. G. Sanjayan, Effect of elevated temperatures on geopolymer paste, mortar and concrete, Cement and Concrete Research 40 (2010) 334-339.
53. Z. Pan, J. Sanjayan, B. Rangan, An investigation of the mechanisms for strength gain or loss of geopolymer mortar after exposure to elevated temperature. Journal of Materials Science 44 (2009) 1873-1880.
54. Z. Pan and J. S. Sanjayan, and F. Collins, Effect of transient creep on compressive strength of geopolymer concrete for elevated temperature exposure, Cement and Concrete Research 56 (2014) 182-189.
55. Z. Pan and J. S. Sanjayan, Stress-strain behaviour and abrupt loss of stiffness of geopolymer at elevated temperatures, Cement and Concrete Composites 32 (2010) 657-664.
56. Z. Pan and J. S. Sanjayan, Factors influencing softening temperature and hot-strength of geopolymers, Cement and Concrete Composites 34 (2012) 261-264.
57. Martin, J. Y. Pastor, A. Palomo, A. F. Jiménez, Mechanical behaviour at high temperature of alkali-activated aluminosilicates (geopolymers), Construction and Building Materials 93 (2015)1188-1196.

All documents, patents, journal articles and other materials cited in the present application are incorporated herein by reference.

While the present invention has been disclosed with references to certain embodiments, numerous modification, alterations, and changes to the described embodiments are possible without departing from the sphere and scope of the present invention, as defined in the appended claims.

Accordingly, it is intended that the present invention is not limited to the described embodiments, but that it has the full scope defined by the language of the following claims, and equivalents thereof.

What is claimed is:

1. A heat treated geopolymer thermal energy storage (TES) concrete product comprising:
   at least one binder;
   at least one alkali activator;
   at least one fine aggregate; and
   at least one coarse aggregate;
   wherein the heat treated geopolymer TES concrete product is subjected to heat treatment to achieve a thermal conductivity and a specific heat capacity that are stable during an operation comprising temperature cycling within the range of about 300° C. to 600° C.,
   wherein the heat treatment comprises drying the TES concrete product after being cured, and increasing the temperature to 600° C. for 6 hours;
   wherein the heat treated geopolymer TES concrete product has a thermal conductivity of at least 1 W/(m·K), and a specific heat capacity of at least 1 MJ/m$^3$/K yielded after heat treatment, and
   wherein the at least one alkali activator comprises metal hydroxide, metal silicate and water.

2. The product of claim 1, wherein the at least one binder is selected from the group consisting of: low-Ca class F fly ash, metakaolin, blast furnace slag, class C fly ash, and vitreous calcium aluminosilicate.

3. The product of claim 1, wherein the at least one binder comprises 10 to 35 wt. % of the TES concrete product.

4. The product of claim 1, wherein the at least one binder is low-Ca class F fly ash with CaO less or equal to 15 wt. %.

5. The product of claim 1, wherein the at least one binder comprises low-Ca class F fly ash and metakaolin.

6. The product of claim 1, wherein the at least one binder is metakaolin.

7. The product of claim 1, wherein the at least one binder comprises blast furnace slag and metakaolin.

8. The product of claim 1, wherein the metal in the at least one alkali activator is potassium, sodium or combinations of both.

9. The product of claim 1, wherein the metal hydroxide comprises 1 to 8 wt. % as $M_2O$ of the TES concrete product, wherein metal M is at least one metal selected from the group consisting of Na and K, wherein the metal silicate comprises 2 to 16 wt. % as $SiO_2$ of the TES concrete product, and wherein the alkali activator comprises water at 4 to 20 wt. % of the TES concrete product.

10. The product of claim 1, wherein at least one fine aggregate comprises 20 to 50 wt. % of the TES concrete product.

11. The product of claim 1, wherein the at least one fine aggregate comprises quartz, aluminum oxide, fused alumina, mullite, kyanite, forsterite, titania, hematite, magnetite, spinel, iron grits and shots, metal scraps, silicon carbide, graphite, graphene, carbon micro-particles, or combinations thereof.

12. The product of claim 1, wherein the at least one fine aggregate comprises iron shots, alumina, and metal scrap, and wherein the metal scrap is selected from the group consisting of: copper, brass, cast iron, and stainless steel.

13. The product of claim 1, wherein the at least one fine aggregate is selected from the group consisting of: quartz, alumina, hematite, carbon micro-particle, and combinations thereof.

14. The product of claim 1, wherein at the least one coarse aggregate comprises 20 to 60 wt. % of the TES concrete product.

15. The product of claim 1, wherein the at least one coarse aggregate is selected from the group consisting of: quartzite, basalt, granite, limestone, refractories, porcelains, and combinations thereof, and wherein the refractories are selected from the group: silica-, magnesia- and alumina-based and the porcelains are selected from the group: alumina-, alumina silicate-, and titania-based.

16. The product of claim 1, where the at least one coarse aggregate is quartz gravel.

17. The product of claim 15, wherein the coarse aggregate comprises recycled refractories and porcelains.

18. The product of claim 1, wherein the TES concrete product further comprises at least one micro and submicron filler comprising up to 35 wt. % of the TES concrete product, wherein the at least one micro and submicron filler is selected from the group consisting of: ground quartz powder, superfine fly ash, silica fume, alumina, or combinations thereof.

19. The product of claim 1, wherein the TES concrete product further comprises at least one thermal stability enhancer up to 15 wt. %.

20. The product of claim 19, wherein the at least one thermal stability enhancer comprises glass powder with a glass transition temperature of 500 to 700° C. and water soluble alkali silicate glass powder, wherein the glass powder is selected from the group consisting of: silicate, borosilicate, and aluminosilicate, and wherein the water soluble alkali silicate glass comprises potassium or sodium silicate.

21. The product of claim 1, wherein TES concrete product further comprises thermally conductive fibers comprising up to 10 wt. %, and wherein the thermally conductive fibers are selected from the group consisting of: steel fiber, copper coated steel fiber, carbon fiber, mullilte, and silicon carbide, or combinations thereof.

22. The product of claim 1, wherein TES concrete product further comprises:
   class F fly ash having less than or equal to 8 wt % of calcium oxide; and
   wherein the at least one alkali activator is alkali silicate activator.

23. The product of claim 22, wherein a solid mixture of at least one binder, fine and coarse aggregates and at least one additives if any are mixed with at least one alkali activator solution, poured into a mold for a TES device and cured at temperatures above 45° C. for 12 to 48 hours at a relative humidity higher than 90%.

24. The product of claim 1, wherein TES concrete product comprises:
   class F fly ash having less than or equal to 8 wt % of calcium oxide; and
   metakaolin or blast furnace slag or both.

25. The product of claim 23, wherein the solid mixture of at least one binder, fine and coarse aggregates and at least one additives if any are mixed with at least one alkali activator solution, poured into a mold for a TES device and cured at temperatures between 45 and 85° C. for 24 hours at a relative humidity higher than 90%.

26. The product of claim 23, wherein the solid mixture of at least one binder, fine and coarse aggregates and at least one additives if any are mixed with at least one alkali activator solution, poured into a mold for a TES device and cured at temperatures between 60 and 85° C. for 12 to 48 hours at a relative humidity higher than 90%.

27. The product of claim 1, wherein the TES concrete product further comprises:
- blast furnaces slag;
- metakaolin; and
- at least one micro and submicron filler.

28. The product of claim 27, wherein a solid mixture of at least one binder, fine and coarse aggregates, at least one micro and submicron filler, and at least one additives if any are mixed with at least one alkali activator solution, poured into a mold for a TES device and cured at temperatures between 20 and about 85° C. for 24 hours at a relative humidity higher than 90%.

29. The product of claim 1, wherein the heat treatment is stepwise.

30. A heat treated geopolymer thermal energy storage (TES) concrete product comprising:
- at least one binder;
- at least one alkali activator;
- at least one fine aggregate; and
- at least one coarse aggregate,
- wherein the heat treated geopolymer TES concrete product is subjected to heat treatment to achieve a thermal conductivity and a specific heat capacity that are stable during an operation comprising temperature cycling within a range of about 300° C. to 600° C.,
- wherein the heat treatment comprises drying the TES concrete product after being cured, and increasing the temperature to 600° C. for 6 hours,
- wherein the heat treated geopolymer TES concrete product has a compressive strength of at least 1500 psi, a thermal conductivity of at least 1 W/(m·K), and a specific heat capacity of at least 1 MJ/m$^3$/K yielded after heat treatment, and
- wherein the at least one alkali activator comprises metal hydroxide, metal silicate and water.

* * * * *